United States Patent [19]

Jebens et al.

[11] Patent Number: 5,237,234

[45] Date of Patent: Aug. 17, 1993

[54] HARMONIC ELECTROSTATIC MOTOR

[75] Inventors: Robert W. Jebens, Skillman; William H. Ninke, Holmdel; William S. N. Trimmer, Belle Mead, all of N.J.

[73] Assignee: AT&T Bell Laboratories, Murray Hill, N.J.

[21] Appl. No.: 256,667

[22] Filed: Oct. 13, 1988

[51] Int. Cl.$^5$ .............................................. H02N 1/00
[52] U.S. Cl. ..................................... 310/309; 310/82; 474/162
[58] Field of Search ..................... 74/804; 310/46, 80, 310/82, 83, 309

[56] References Cited

U.S. PATENT DOCUMENTS

| | | | |
|---|---|---|---|
| 2,439,499 | 4/1948 | Williams et al. | 310/82 |
| 3,530,322 | 9/1970 | Newell | 310/82 |
| 4,395,650 | 7/1983 | Kettenring | 310/82 |
| 4,412,794 | 11/1983 | Presley | 74/804 |
| 4,482,828 | 11/1984 | Vergues et al. | 310/83 |
| 4,754,185 | 6/1988 | Gabriel et al. | 310/309 |
| 4,814,657 | 3/1989 | Yano et al. | 310/309 |
| 4,922,164 | 5/1990 | Jacobsen et al. | 310/309 |
| 4,954,735 | 9/1990 | Parsons | 310/82 |

FOREIGN PATENT DOCUMENTS

| | | | |
|---|---|---|---|
| 983078 | 6/1951 | France | 310/82 |
| 1321561 | 2/1963 | France | 310/82 |
| 64-12876 | 1/1989 | Japan | 310/309 |
| 159716 | 1/1933 | Switzerland | 310/82 |
| 697371 | 9/1953 | United Kingdom | 310/82 |

OTHER PUBLICATIONS

Fujita et al., "The Principle of an Electrostatic Linear Actuator", *Transducers '87*, Tokyo Jun., 1987, pp. 861–864.

Laithwaite et al., "Linear-Motion Electrical Machines", Proc. IEEE, vol. 58, No. 4, pp. 531–542.

*Primary Examiner*—Steven L. Stephan
*Assistant Examiner*—D. L. Rebsch
*Attorney, Agent, or Firm*—J. W. Herndon; M. S. Landis

[57] ABSTRACT

An electrostatic motor comprising a stator and a rotor, one of which is equipped with a plurality of lands to which a voltage is sequentially applied. The other of the stator and rotor is made of conductive material. Rolling contact is established between the stator and rotor along at least one line of contact. The rolling contact is controlled to repetitive first and second paths along first and second surfaces of the stator and rotor, respectively, in which the lengths of the first and second paths are different. Embodiments include a cylindrical motor, a flexible disk motor and a conical motor.

9 Claims, 5 Drawing Sheets

HARMONIC ELECTROSTATIC MOTOR

TECHNICAL FIELD

The invention relates to the field of motors in general and particularly to the field of micromechanics and microelectrostatic motors.

BACKGROUND OF THE INVENTION

Micromechanical systems have many potential applications, including electronic assembly, fiber alignment, medical applications, spacecraft applications and the like. One of the challenges of this field has been the development of microactuators, such as motors. Electrostatic motors described in the literature suffer from several difficulties such as friction, the lack of suitable gears to match the impedance of the motor to the load, large clamping forces that tend to bind the motor, and the need for better bearings. Moreover, at the present time, known electrostatic motors tend to be large and require substantial voltages for operation. A need exists for improvements in these areas to realize effective and useful electrostatic motors.

SUMMARY OF THE INVENTION

The invention is an electrostatic motor comprising a stator and a rotor, one of which is equipped with a plurality of lands to which a voltage is sequentially applied. The other of the stator and rotor is made of conductive material. An insulating layer separates the lands from the conductive material. When a voltage is sequentially applied to the lands, rolling contact is established between the stator and rotor along at least one line of contact. The rolling contact is controlled to repetitive first and second paths along first and second surfaces of the stator and rotor, respectively, in which the lengths of the first and second paths are different.

In a preferred embodiment, the stator or the rotor is a member containing a cylindrical hole and the other of the stator or rotor is a segmented cylindrical member of diameter less than the diameter of the hole in which it is located. The segments form the conductive lands. Means may be provided for slidably connecting a source of potential to one of the stator and rotor, although this is not necessary for operation. If present, this means may take the form of an electrically conductive, flexible shaft extending from an end face of the cylindrical member to a source of potential. Means are also provided for coupling rotational energy from the cylindrical member. The above-mentioned shaft may be used for this purpose or another flexible shaft extending from an opposite end face of the cylindrical member may be used. Mating keying means, such as gear teeth, may also be located on the first and second surfaces of the stator and rotor, respectively, for preventing slippage at a line of rolling contact.

In another embodiment, one of the stator and rotor comprises a member with a flat surface containing the lands arranged in a circle. The other of the stator and rotor comprises a flexible conductive disk. The means for controlling rolling contact comprises means for rotationally and concentrically mounting the flexible disk parallel to the surface containing the lands and spaced apart therefrom a distance such that the disk is attracted to and touches the surface containing the lands when a voltage is applied to a land.

In still another embodiment, one of the stator and rotor further comprises a flat surface and the other of the stator and rotor is a cone shaped member. The rotor is rotationally mounted to the stator by fulcrum means located on the stator.

Contrary to the known art, the embodiments of the motor described herein use frictional and clamping forces between the stator and rotor as advantages. Further advantages over the art include integral gear reduction and bearings. The invention is particularly well suited for realizing motors for miniature and micro applications. However, the invention is not limited to such applications, and large scale embodiments can be used in more conventional applications.

DETAILED DESCRIPTION

Figure 1:
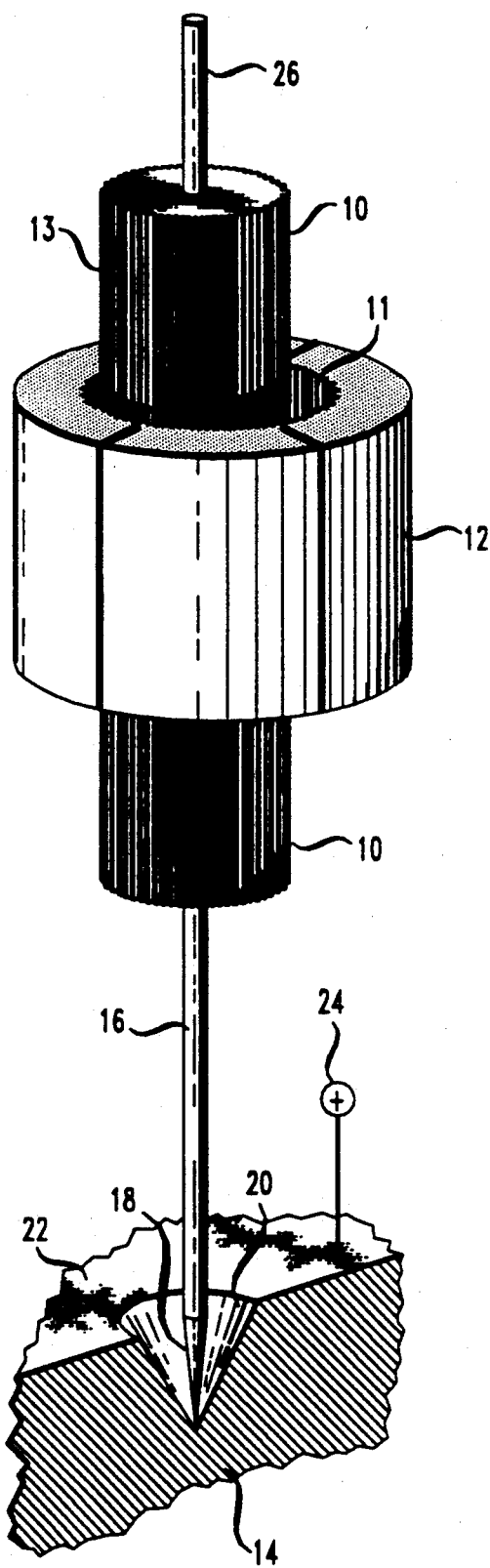
FIG. 1 shows a cylindrical embodiment of a harmonic motor.

A preferred illustrative embodiment of the harmonic motor is shown in FIG. 1. This illustrative embodiment includes a rotor 10 made of aluminum and having a cylindrical outside surface 13. The rotor 10 is inserted into a bored hole 11 in a brass stator 12. Electrically conductive materials other than aluminum and brass could also be used. The rotor 10 is supported on a pivot bearing 14 by means of a electrically conductive and flexible wire 16. In one embodiment, shaft 16 is constructed from piano wire that is 0.015 inch in diameter and 2.5 inches long. Shaft 16 is electrically attached to the rotor 10 at its center axis. The tip 18 of shaft 16 is sharpened to a point which rotates in a notch 20 of a bronze plate 22 to form the pivot bearing. The conductive plate 22 and shaft 16 also serve to couple voltage from a source 24 to the rotor 10. Another flexible shaft 26 may be used to couple the rotational energy of the rotor to other devices.

Figure 2:
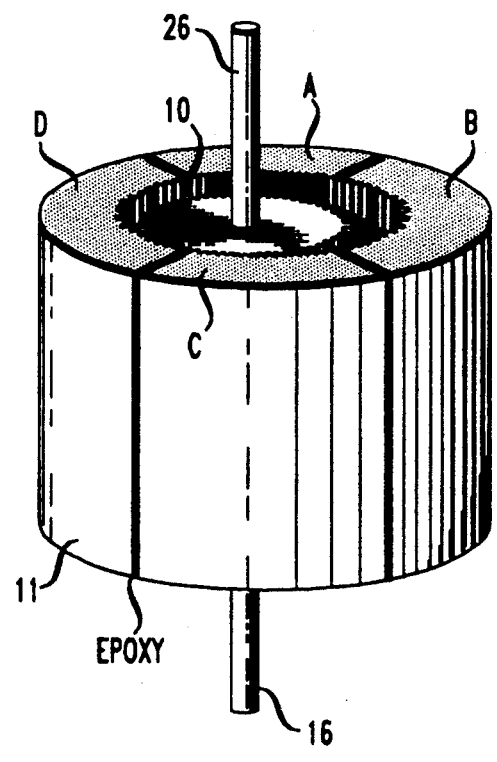
FIG. 2 shows an illustrative construction of a cylindrical stator that is divided into electrically isolated segments for use as lands (electrodes)

The stator 12 is slotted to form four electrode segments (A, B, C, D) shown in FIG. 2. These four segments are electrically isolated from each other by a thin layer of epoxy or other suitable bonding material. The aluminum body of the rotor is covered with a thin layer of epoxy, illustratively 2 to 5 microns. The outer diameter of the rotor is slightly less than the diameter of the hole in the stator. In one illustrative embodiment, the hole 11 is between 0.12520 to 0.12540 inch in diameter, and the rotor 10 is between 0.12440 to 0.12460 inch in diameter. The length of the stator is illustratively 0.5 inch.

Figure 3:
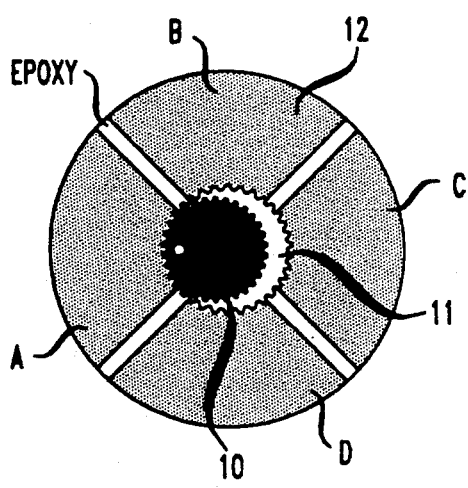
FIGS. 3 through 7 illustrate the relative rotation of the rotor of the motor of FIG. 1 as it rolls on the inside surface of the stator.
Figure 4:
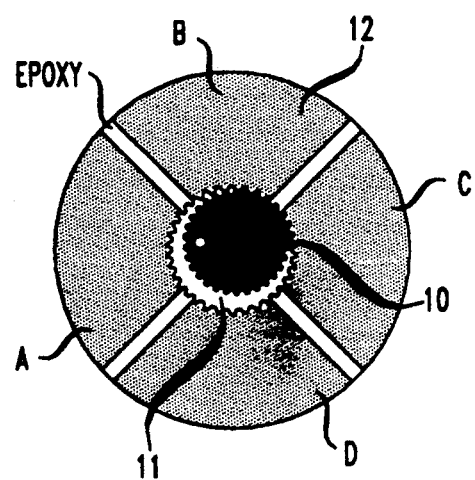
Figure 5:
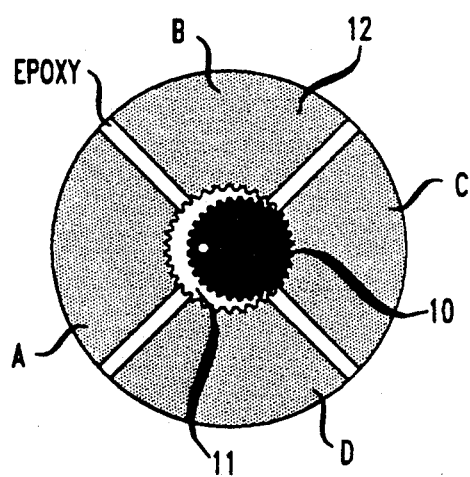
Figure 6:
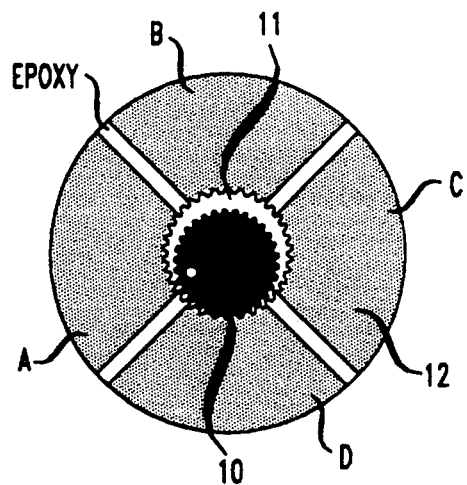
Figure 7:
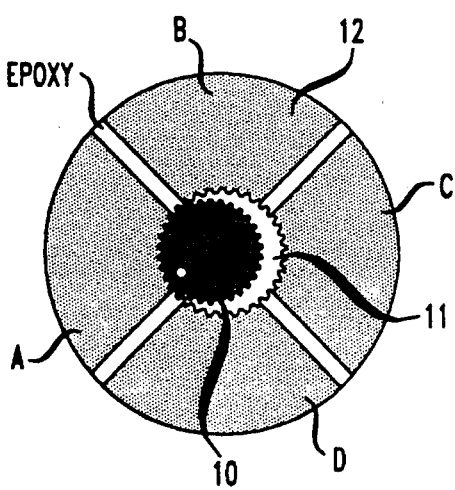

The motor operates as follows. When a voltage is applied between the rotor 10 and, for example, stator segment A, the rotor moves to the position shown in FIG. 3. As the voltage is then sequentially applied between the rotor and segments B, C, D and again to A, the rotor continues to roll as shown in FIGS. 4 through 7. The key to operation of this motor is the difference in circumference between that of the stator hole and that of the rotor. A white dot is shown on the rotor opposite the segment A in FIG. 3 and in each of the FIGS. 4 through 7 to give a perspective of the relative rotation of the rotor as it rolls around the stator hole 11. After the rotor has rolled once around the inside of the stator hole, it has rotated about its axis only slightly. In other words, the path length traversed by the rotor as it rolls once around the circumference of the stator is substantially greater than the circumference of the rotor. Thus, a gear reduction is achieved which is given by the ratio $$\frac{d_r}{r_s - r_r},$$

where $d_s$ and $d_r$ are the diameter of the stator and rotor, respectively.

The friction between the rotor and stator along the rolling line of contact is an advantage, rather than a disadvantage as with the art, because the friction helps to prevent the rotor from slipping as it rolls inside the hole. The motor is more efficient than prior electrostatic motors because the motive clamping force used here is larger than the tangential force used by the earlier motors.

This illustrative motor has been operated successfully with applied voltages of between 85 and 250 volts. The output power generated by the motor can be increased substantially by decreasing the thickness of the insulating layer between the stator and rotor, by increasing the voltage applied between the stator and rotor and by increasing the dielectric constant of the insulating material.

Figure 8:
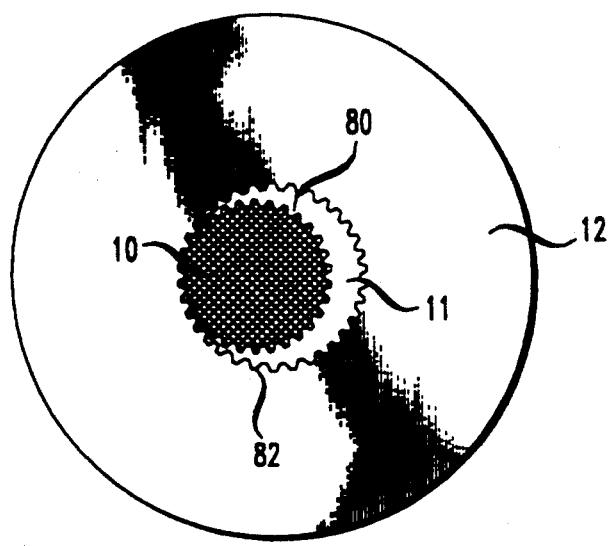
FIG. 8 illustrates the use of gear teeth on the stator and rotor to prevent relative slippage between the two members and to establish precise stepping ratios.

A variation of the preferred embodiment is illustrated in FIG. 8 in which the surfaces of the rotor and stator contain intermeshing gear teeth 80 and 82, respectively. This has several advantages. First, the rolling line of contact between the stator and rotor surfaces cannot slip, since there is a positive engagement of the rotor and stator. This improves the efficiency and allows use of the harmonic motor as a stepping motor because of the defined relationship between the number of electrical drive phases and the rotation of the motor. Secondly, lubrication of the gear teeth can be used because contact friction is no longer required to prevent slippage. The dielectric constant of a lubricating oil may be greater than air and used to increase the capacitance between the rotor and stator. This, in turn, increases the motive clamping force. Thirdly, the gear ratio may be adjusted by using different sized gear teeth on the rotor and stator.

Figure 9:
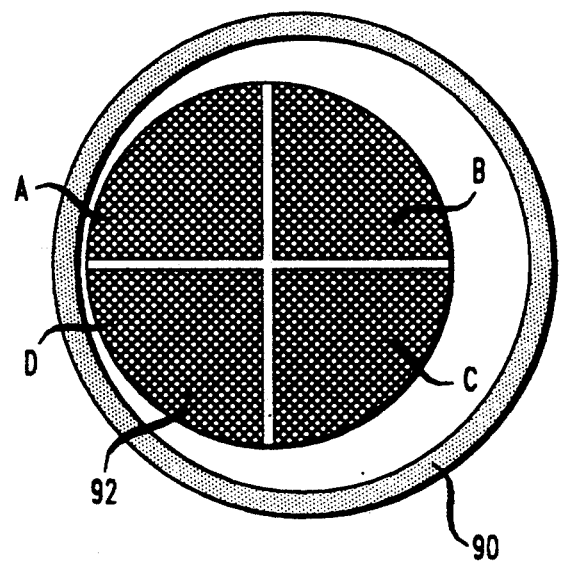
FIG. 9 shows an embodiment of the cylindrical motor in which the outside member is the rotor.
Figure 10:
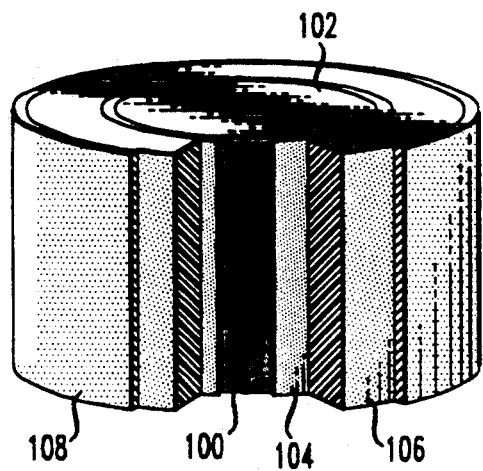
FIG. 10 illustrates a method of making a micro version of the motor of FIG. 9.

Another variation interchanges the stator and rotor of FIG. 1, such as shown in FIG. 9. In this case, the rotor 90 can be an annular ring or a thin membrane and the stator 92 is segmented. The rotor can be attracted to the segmented stator simultaneously at a plurality of locations by applying voltage simultaneously to the appropriate lands. The structure of FIG. 9 can be made by a sacrificial techniques, among others. One sacrificial technique is shown in FIG. 10. Conductive lands 100 are deposited onto a cylindrical stator base 102, which is made of a nonconductive material. An insulating layer 104 of epoxy, anodized aluminum or oxidized silicon, or other suitable material, is next deposited over the entire outside cylindrical surface. This layer is typically one to five microns thick. Next, a sacrificial layer 106, made of a mixture of acetone and butyl acetate, is deposited onto the insulating layer 104, followed by a conducting layer 108. Layer 108 may be formed by electroplating, by deposition or by painting. When the sacrificial layer 106 is removed by dissolving with acetone, for example, a flexible outer rotor membrane is left surrounding the cylindrical stator 102.

Figure 11:
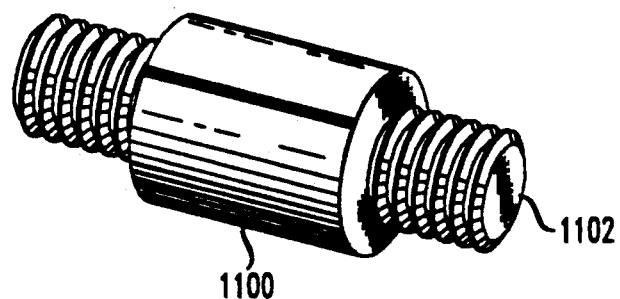
FIG. 11 shows an embodiment of the motor of FIG. 1 which introduces linear axial motion of the internal rotor.

A linear motor may be made as shown in FIG. 11. This particular illustrative embodiment uses a segmented stator 1100. The rotor 1102 is constructed with threads on its outside surface, while the stator contains mating threads on its inside surface. As the rotor rolls on the inside of the stator during motor operation, the rotor also moves linearly along its axis as a result of the threads. As with an earlier discussed variation, gear teeth can be placed on this screw motor. An easy way to visualize doing this it to cut small channels or slots in both the stator and rotor threads parallel to the cylindrical axis of the motor. These slots can be used as intermeshing gear teeth on the stator and rotor. As the rotor turns, these teeth prevent the rotor from slipping in the stator and establish a precise stepping ratio.

Figure 12:
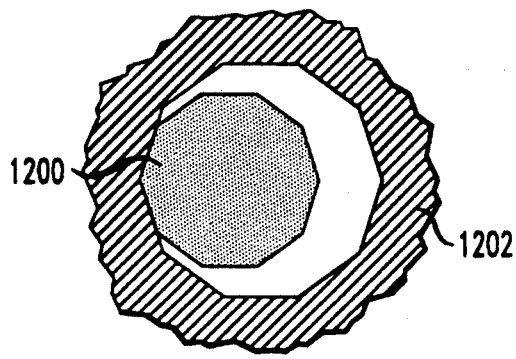
FIG. 12 shows an embodiment of the motor of FIG. 1 in which flat surface faces as used to prevent relative slippage between the stator and rotor.

A number of other variations of the harmonic motor are described below. As shown in FIG. 12, the circular cylindrical walls of the stator and rotor may be replaced with polygonal mating surfaces. The rolling motion of one of the members is maintained. However, the polygonal walls act similarly to gear teeth to prevent slippage of the rotor as it rolls on the stator surfaces.

Figure 13:
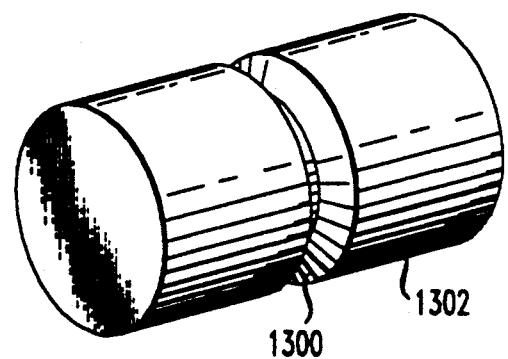
FIG. 13 shows a grooved embodiment of the rotor of FIG. 1 used to prevent axial movement of the rotor.

Bearings to support the thrust of the stator or rotor along the cylindrical axis may be incorporated in the motor. FIG. 13 shows an illustrative cylinder 1300 into which a grove 1302 has been cut. The hole in the other member (stator or rotor) in which this cylinder 1300 resides has a matching protuberance that fits into the groove 1302. This prevents the cylinder 1300 from moving in the axial direction as it rolls in the hole. Many such grooves and matching protuberances advantageously increase the surface area, and hence the capacitance, between the rotor and stator.

Figure 14:
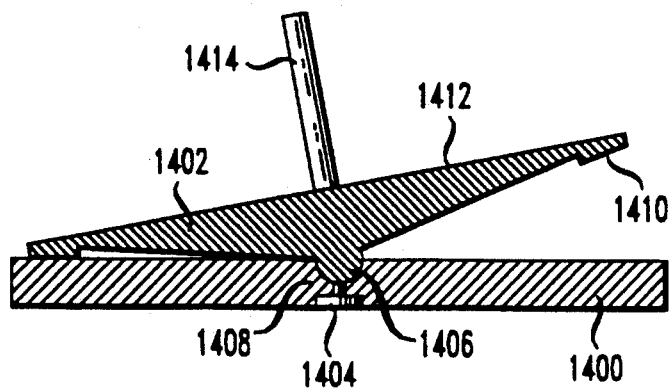
FIGS. 14 and 15 show a conical embodiment of a harmonic motor.
Figure 15:
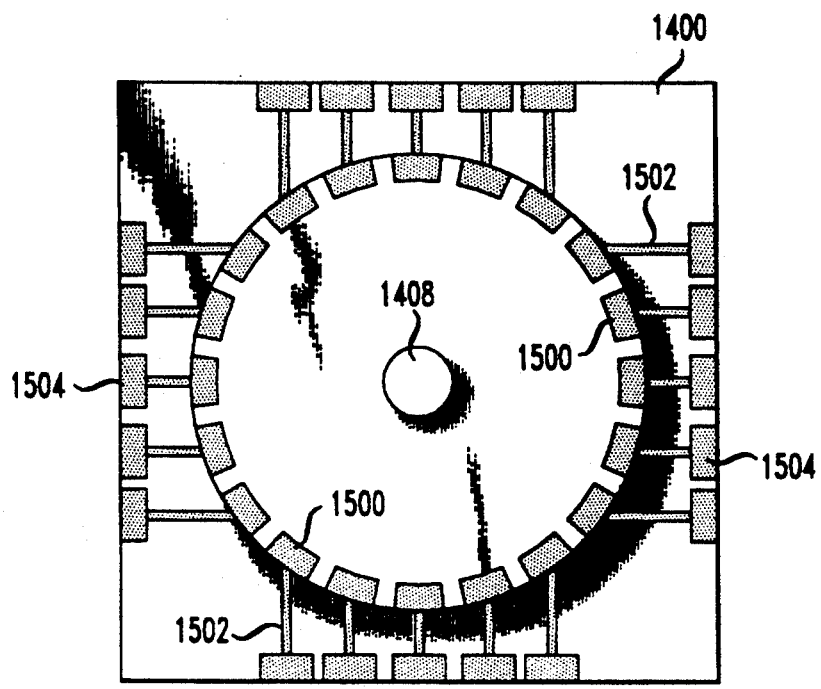

FIG. 14 shows a side view of a conical harmonic electrostatic motor using the same principles of the invention as discussed above. The stator 1400 and rotor 1402 may be machined from a material such as silicon, for example. A top view of the stator is shown in FIG. 15. The stator is essentially a base having a flat surface, onto which is deposited a series of conductive lands 1500 arranged around the perimeter of a circle. Conductive leads 1502 and contact pads 1504 are also deposited on the surface for applying voltages to the lands. The rotor is a cone-shaped member. Typically the angle of the cone at its apex approaches 180 degrees. The surface of the stator and/or the rotor may be coated with a thin insulating and protecting layer of suitable material. With reference to FIG. 14, at the apex of the cone is a hemispherical bearing 1406 that rests in a hole 1408 in the center of the circle formed by the lands on the stator. Preferably, a rim 1410 is located along the outside perimeter of the cone, although this is not strictly necessary. The rim is coated with a layer of insulating material. Voltages are applied sequentially to the lands 1500 to cause the cone to roll on the flat surface of the stator, propelled by electrostatic forces between the lands and the conductive coating on the rotor. Energy may be coupled from the rotating cone by means of a flexible shaft 1414 mounted at the center of the cone base 1412. Because the circumference of the base 1412 of the cone is smaller than that of the circle on the flat stator surface on which it rolls, an inherent gear reduction is achieved. That is, each time the cone traverses the circle on the stator, the cone itself rotates somewhat less, depending on the angle of its apex. Obviously, many variations exist of this embodiment of the invention, also. For example, both the stator and the rotor may be cone-shaped with different apex angles. Gear teeth or similar arrangements may be located on the stator and rotor to prevent slippage.

Figure 16:
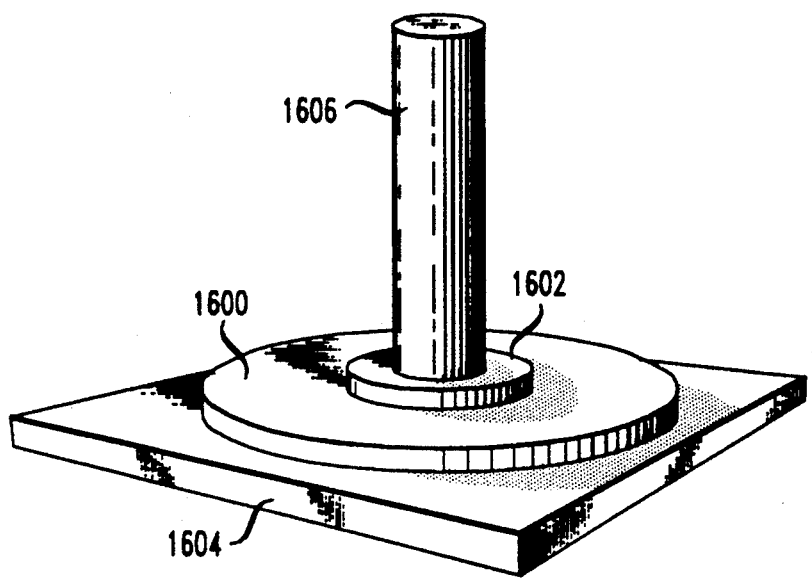
FIG. 16 shows a flexible disk embodiment of the harmonic motor.

FIG. 16 shows a flexible disk embodiment of the harmonic motor. The basic configuration of this motor is a flexible disk 1600 arranged on a bushing 1602 that rests on a flat base surface 1604. Base 1604 is assumed to be the stator for this discussion and the disk 1600 is assumed to be the rotor, although these roles can be reversed. The stator surface may be configured similarly to that shown in FIG. 15. The bushing 1602 maintains a small separation between the rotor 1600 and stator 1604 in the absence of voltage applied to lands on the stator. The disk 1600 is may be made of polycrystalline silicon or mylar, for example. If the disk is nonconductive, it will be coated with a conductive material. It is pivoted to rotate about the center of its axis on a pin 1606. Again, an insulating layer of suitable material separates the stator and rotor. Preferably, this layer is coated onto the surface of the stator 1604 covering the lands. In operation, the disk 1600 is pulled into contact with the stator 1604 along one or more radial lines near its perimeter. This is caused by applying a voltage to one or more of the lands on the stator. If the land voltages are applied in sequence, the line or lines of contact of the disk to the stator will rotate, forming rolling lines of contact as the voltage is moved from land to land. The lines of contact form an imaginary circular band on the stator having a smaller outside radius than that of the disk. Thus, differential motion is created causing the disk to rotate.

Again, many variations of the flexible disk embodiment may be envisioned. For example, the rotor can be made of individual splines, like the letters on a daisy wheel printer. The tips of these splines may fit into teeth on the stator. This, in turn, prevents slippage and establishes a precise gear reduction ratio.

It is to be understood that the above-described arrangements are merely illustrative of the application of principles of the invention and that other arrangements may be devised by workers skilled in the art without departing from the spirit and scope of the invention.

We claim:

1. A miniature electrostatic motor comprising a stator (12) and a rotor (10), one of the stator and rotor having a plurality of lands (A, B, C, D), means for applying a voltage sequentially to the lands and the other of the stator and rotor being made of conductive material, characterized by an insulating layer between the stator and the rotor, the thickness of the insulating layer being small relative to the dimensions of the rotor, rolling contact between the insulating layer and rotor along at least one line of contact, and means (11, 13) for controlling the rolling contact to repetitive first and second paths along surfaces of the stator and rotor, respectively, wherein the lengths of the first and second paths are different.

2. The motor of claim 1 wherein the flat surface contains the lands arranged in a circle.

3. The motor of claim 1 wherein the flexible disk contains the lands arranged in a circle.

4. The motor of claim 1 wherein the flexible disk consists of mylar or polycrystalline silicon coated with a conductive material and the flat surface which touches said portion of the disk is coated with an insulating layer.

5. A miniature electrostatic motor comprising a stator and a rotor, one of the stator and rotor having a plurality of lands, means for applying a voltage sequentially to the lands, the other of the stator and rotor being made of conductive material, an insulating layer between the stator and the rotor, the thickness of the insulating layer being small relative to the dimensions of the rotor, rolling contact between the insulating layer and rotor along as least one line of contact, and means for controlling the rolling contact to repetitive first and second paths along surfaces of the stator and rotor, respectively, where the lengths of the first and second paths are different, characterized by one of the stator and rotor further comprises a flat surface, and the other of the stator and rotor further comprises a cone shaped member, and the means for controlling rolling contact further comprises fulcrum means located on the flat surface for allowing rotation of the cone shaped member about its apex with respect to the flat surface.

6. The motor of claim 5 wherein the flat surface contains the lands arranged in a circle.

7. The motor of claim 5 wherein the cone shaped member contains the lands arranged in a circle.

8. The motor of claim 5 wherein the fulcrum means comprises a hemispherical bearing (1406).

9. The motor of claim 5 wherein the cone shaped member includes a raised rim (1410) on the outer perimeter of the cone, said rim coated with layer of insulating material and adapted to contact the flat surface.

* * * * *

UNITED STATES PATENT AND TRADEMARK OFFICE
CERTIFICATE OF CORRECTION

PATENT NO. : 5,237,234

DATED : August 17, 1993

INVENTOR(S) : Robert W. Jebens, William H. Ninke, William S.N. Trimmer

It is certified that error appears in the above-indentified patent and that said Letters Patent is hereby corrected as shown below:

Please replace the present claim 1 with the following:

--A miniature electrostatic motor comprising a stator and a rotor, one of the stator and rotor having a plurality of lands, means for applying a voltage sequentially to the lands, the other of the stator and rotor being made of conductive material, an insulating layer between the stator and the rotor, the thickness of the insulating layer being small relative to the dimensions of the rotor, rolling contact between the insulating layer and rotor along as least one line of contact, and means for controlling the rolling contact to repetitive first and second paths along surfaces of the stator and rotor, respectively, where the lengths of the first and second paths are different, characterized by one of the stator and rotor further comprises a flat surface, containing the lands and the other of the stator and rotor further comprises a flexible conductive disk, and the means for controlling rolling contact further comprises means (1602) for rotationally and concentrically mounting the flexible disk parallel to the surface containing the lands and spaced apart therefrom a distance such that a portion of the disk is attracted to and touches the surface containing the lands when a voltage is applied to to a land.--

Signed and Sealed this

Third Day of January, 1995

Attest:

BRUCE LEHMAN

*Attesting Officer*   *Commissioner of Patents and Trademarks*